United States Patent
Oh et al.

(10) Patent No.: US 8,843,635 B2
(45) Date of Patent: Sep. 23, 2014

(54) APPARATUS AND METHOD FOR PROVIDING A SERVICE THROUGH SHARING SOLUTION PROVIDING UNIT IN CLOUD COMPUTING ENVIRONMENT

(75) Inventors: Yun-Seok Oh, Gyeonggi-do (KR); Suk-Joon Yum, Seoul (KR)

(73) Assignee: KT Corporation, Gyeonggi-do (KR)

(*) Notice: Subject to any disclaimer, the term of this patent is extended or adjusted under 35 U.S.C. 154(b) by 126 days.

(21) Appl. No.: 13/336,177

(22) Filed: Dec. 23, 2011

(65) Prior Publication Data

US 2012/0166648 A1 Jun. 28, 2012

(30) Foreign Application Priority Data

Dec. 23, 2010 (KR) .................. 10-2010-0133723

(51) Int. Cl.
*G06F 15/173* (2006.01)
*G06F 9/50* (2006.01)

(52) U.S. Cl.
CPC .................................. *G06F 9/5055* (2013.01)
USPC ........................... 709/226; 709/223; 709/224

(58) Field of Classification Search
USPC .......................................... 709/226, 223–224
See application file for complete search history.

(56) References Cited

U.S. PATENT DOCUMENTS

| 7,577,722 | B1 | 8/2009 | Khandekar et al. |
| 7,657,512 | B2 * | 2/2010 | Fischer .................. 707/999.003 |
| 7,836,448 | B1 * | 11/2010 | Farizon et al. ................ 718/100 |
| 7,970,897 | B1 * | 6/2011 | Baumback et al. ........... 709/224 |
| 8,508,768 | B2 * | 8/2013 | Sekine ......................... 358/1.15 |
| 2005/0108275 | A1 * | 5/2005 | Capotosto et al. ............ 707/102 |
| 2006/0031116 | A1 * | 2/2006 | Bogasky et al. ................ 705/12 |
| 2006/0069828 | A1 | 3/2006 | Goldsmith |
| 2007/0101061 | A1 * | 5/2007 | Baskaran et al. ............. 711/118 |
| 2008/0104608 | A1 * | 5/2008 | Hyser et al. ................... 718/105 |
| 2009/0064087 | A1 * | 3/2009 | Isom ............................. 717/101 |
| 2010/0042449 | A1 * | 2/2010 | Thomas ............................ 705/7 |
| 2010/0161806 | A1 * | 6/2010 | Qiu et al. ....................... 709/227 |
| 2010/0199285 | A1 | 8/2010 | Medovich |
| 2010/0318609 | A1 | 12/2010 | Lahiri et al. |
| 2011/0145408 | A1 * | 6/2011 | Olsson .......................... 709/225 |
| 2011/0314465 | A1 * | 12/2011 | Smith et al. ....................... 718/1 |
| 2012/0005346 | A1 * | 1/2012 | Burckart et al. ............. 709/226 |
| 2012/0046980 | A1 * | 2/2012 | Allam et al. ................. 705/7.12 |
| 2012/0082165 | A1 * | 4/2012 | Cai et al. ....................... 370/401 |
| 2012/0117075 | A1 * | 5/2012 | Gokulakannan .............. 707/741 |
| 2012/0124592 | A1 * | 5/2012 | Kummamuru ............... 718/104 |
| 2012/0143588 | A1 * | 6/2012 | Liu et al. ......................... 703/22 |
| 2012/0158920 | A1 * | 6/2012 | Yang ............................. 709/220 |
| 2012/0322424 | A1 * | 12/2012 | Xie ............................. 455/414.1 |

FOREIGN PATENT DOCUMENTS

| KR | 10-2007-0032734 A | 3/2007 |
| KR | 10-0931260 B1 | 12/2009 |

* cited by examiner

*Primary Examiner* — Waseem Ashraf
(74) *Attorney, Agent, or Firm* — IP Legal Services, LLC

(57) ABSTRACT

Apparatus and method for providing a service through a sharing solution providing unit in a cloud computing environment. The apparatus may include a first service unit, a second service unit, and a solution managing unit. The first service unit may provide a first service requiring a first solution. The second service unit may provide a second service that is different from the first service and requires the first solution. The solution managing unit may provide the first solution to the first service unit and the second service unit by sharing at least one solution providing unit that generates the first solution.

8 Claims, 13 Drawing Sheets

APPARATUS AND METHOD FOR PROVIDING A SERVICE THROUGH SHARING SOLUTION PROVIDING UNIT IN CLOUD COMPUTING ENVIRONMENT

CROSS REFERENCE TO PRIOR APPLICATIONS

The present application claims priority under 35 U.S.C. §119 to Korean Patent Application No. 10-2010-0133723 (filed on Dec. 23, 2010), which is hereby incorporated by reference in its entirety.

FIELD OF THE INVENTION

Apparatuses and methods consistent with the present invention relate to providing a service by sharing solution providing units in a cloud computing environment.

BACKGROUND OF THE INVENTION

Lately, different types of cloud computing services have been introduced. Such a cloud computing service may be provided through virtual machines created in a cloud computing environment. A system may generate different solutions to provide a respective service. The solutions may be results of performing functions to provide the respective service. In order to obtain such solutions, the system may dedicatedly create a virtual machine for each service.

Different types of services, however, may frequently require the same solution. For example, an image search service and an advertisement service may commonly require an image recognition solution for recognizing a target image. Although the image search service and the advertisement service commonly require the same solution, a related system dedicatedly creates a virtual machine for each service. For example, a related system may create two image recognition solution providing units for the image search service and the advertisement service. Such a manner of using the solution providing unit may waste resources in a cloud computing environment.

SUMMARY OF THE INVENTION

Embodiments of the present invention overcome the above disadvantages and other disadvantages not described above. Also, the present invention is not required to overcome the disadvantages described above, and an embodiment of the present invention may not overcome any of the problems described above.

In accordance with an aspect of the present invention, a system may share at least one solution providing unit to provide different types of services in a cloud computing environment.

In accordance with another aspect of the present invention, one solution providing unit may be commonly used by a plurality of service units for providing different services.

In accordance with another aspect of the present invention, a plurality of service units may share at least one solution providing unit through a related solution managing unit.

In accordance with an embodiment of the present invention, an apparatus may be provided for providing a service in a cloud computing environment by sharing at least one solution providing unit. The apparatus may include a first service unit, a second service unit, and a solution managing unit. The first service unit may provide a first service requiring a first solution. The second service unit may provide a second service that is different from the first service but also requires the first solution. The solution managing unit may provide the first solution to both the first service unit and the second service unit by sharing at least one solution providing unit that generates the first solution.

The solution managing unit may receive a solution request for the first solution from at least one of the first service unit and the second service unit, select at least one solution providing unit based on a processing load and a location of each solution providing unit in response to the solution request, and request the selected at least one solution providing unit to perform a function for generating the first solution. Then, the solution managing unit may receive the first solution from the selected at least one solution providing unit, and provide the received first solution to at least one of the first service unit and the second service unit. Furthermore, the solution managing unit may create at least one virtual machine as a solution providing unit that performs at least one function for generating the first solution in response to a creation request from at least one of the first and second service units. Alternatively, the solution managing unit may delete one or more existing solution providing units according to a deletion request from at least one of the first and second service units. The solution managing unit may deliver the first solution from the selected at least one solution providing unit to the first service unit and the second service unit, and the first service unit and the second service unit may respectively provide the first service and the second service based on the received first solution delivered from the solution managing unit.

In accordance with another embodiment of the present invention, an apparatus may be provided for providing a service in a cloud computing environment. The apparatus may include a plurality of service unit, and a first solution managing unit. The plurality of service units may be configured to provide different types of services. The first solution managing unit may be configured to provide a first solution to the plurality of service units. The first solution may be commonly required for providing the different types of services.

The first solution managing unit may manage a plurality of solution providing units that generate the first solution. The first solution managing unit may be configured to select one of the plurality of solution providing units based on processing loads of the plurality of solution providing units, and provide the first solution generated by the selected one of the plurality of solution providing units to the plurality of service users. The first solution managing unit may create a virtual machine as a solution providing unit generating the first solution. The first solution managing unit may delete the created solution providing unit when the first solution managing unit does not receive a first solution request for a certain time period.

Each one of the plurality of service units may be configured to receive a service request from at least one user equipment, determine solutions required for providing the requested service, select the first solution managing units when the determined solutions include the first solution, transmit a solution request to the first solution managing unit, receive the first solution from the first solution managing unit, and provide the requested service using the first solution.

Each one of the plurality of service units may receive service information with the service request from the at least one user equipment. The service request may include information on the requested service and the service information may include data required for the requested service. Each one of the plurality of service units may be configured to determine the required solutions based on the service request and the service information received from the user equipment.

The first solution managing units may be configured to receive a solution request from at least one of the plurality of service units, select at least one solution providing unit based on processing loads and locations of the solution providing units, receive the first solution from the selected at least one solution providing unit, and provide the first solution to the plurality of service unites.

The first solution managing unit may transmit the solution request with service information to the selected at least one solution providing unit, and the selected at least one solution providing unit may perform a function generating the first solution based on the service information and return the first solution to the first solution managing unit.

In accordance with another embodiment of the present invention, a method may be provided for providing a service in a cloud computing environment. In the method, service requests for a first service and a second service. The first service may be different from the second service. The first service and the second service may commonly require a common solution. Then, solutions required for providing the plurality of services may be determined based on the service requests and the service information. Functions may be performed to generate the required solutions. For generating the required solutions, at least one solution providing unit generating the common solution may be commonly used. The first service and the second service may be provided based on the generated solutions including the first solution.

In order to generate the required solution, solution managing units may be selected based on the determined solutions. The selected solution managing units may include a common solution managing unit that manages the at least one solution providing unit generating the common solution. The common solution managing unit may select one of the solution providing units generating the common solution based on a processing load and a location of each solution providing unit. The selected solution providing unit may perform a function based on the service information and return a result of the performed function as the common solution to the first solution managing unit. Furthermore, the common solution managing unit may provide the common solution for a plurality of service units that provide services commonly requiring the common solution. In addition, the first solution managing unit creates a virtual machine as a solution providing unit generating the first solution.

BRIEF DESCRIPTION OF THE DRAWINGS

The above and/or other aspects of the present invention will become apparent and more readily appreciated from the following description of embodiments, taken in conjunction with the accompanying drawings, of which.

DETAILED DESCRIPTION OF THE INVENTION

Figure 1:
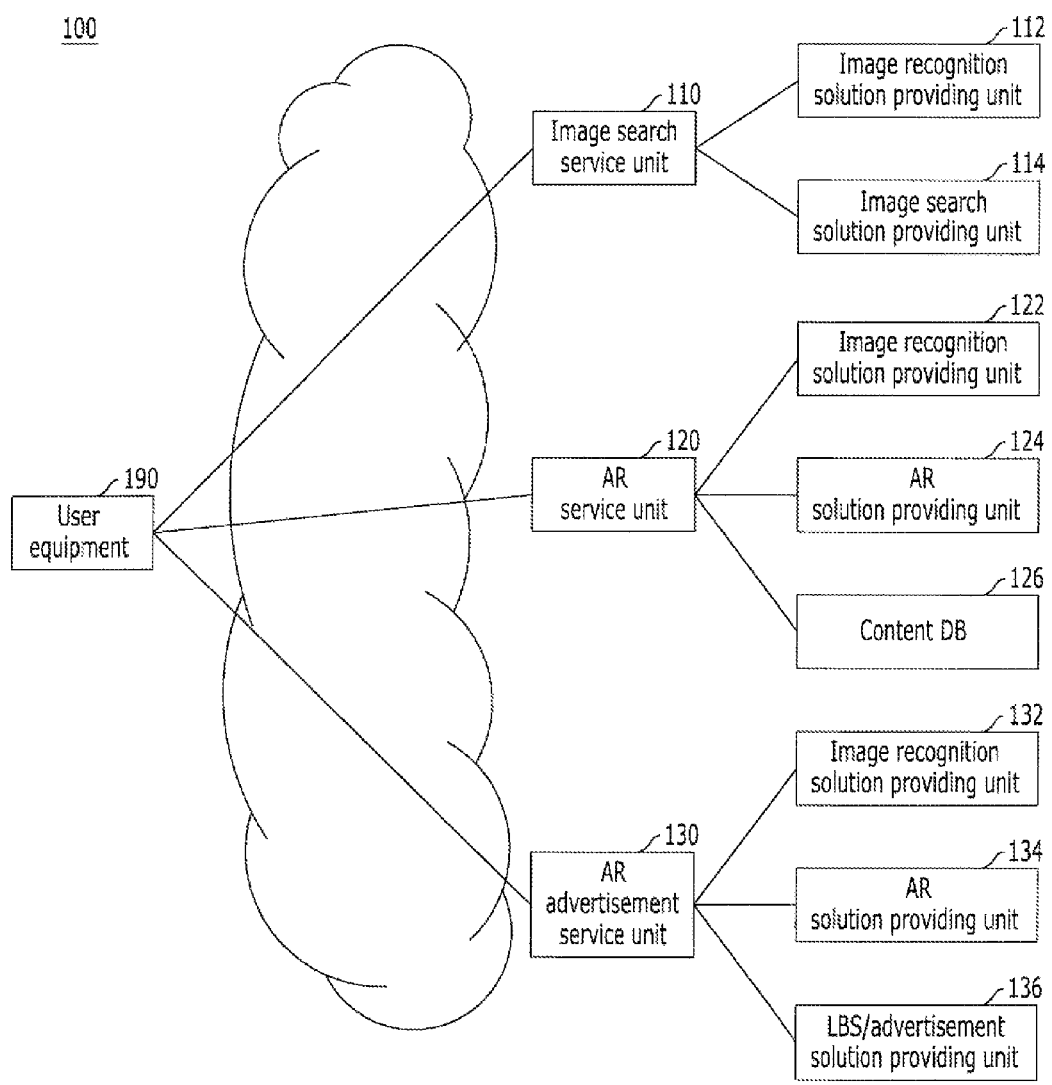
FIG. 1 illustrates a related system for providing a service in a cloud computing environment.

Reference will now be made in detail to embodiments of the present invention, examples of which are illustrated in the accompanying drawings, wherein like reference numerals refer to like elements throughout. The embodiments are described below, in order to explain the present invention by referring to the figures.

Throughout the specification, a service unit may denote a unit that provides a requested service by sharing at least one solution providing unit through a corresponding solution managing unit in a cloud computing environment. The service unit may be a virtual machine created on a cloud computing environment or a hardware computing device coupled to a cloud computing system through a network. The service unit may include a communication unit for communicating with other devices in the cloud computing environment and a control unit for controlling other devices that perform functions required for providing the requested service. A solution may denote a result of performing a corresponding function required for providing a requested service. A solution providing unit may be a unit that provides a requested solution by performing a corresponding function required for providing a requested service. Such a solution providing unit may be a virtual machine created in a corresponding cloud computing environment or a hardware device coupled to a corresponding cloud computing system through a network.

FIG. 1 illustrates a related system for providing a service in a cloud computing environment.

Referring to FIG. 1, the related system 100 may include a plurality of service units and a plurality of solution providing units. For example, the related system 100 may include an image search service unit 110, an augmented reality (AR) service unit 120, an AR advertisement service unit 130, and image recognition solution providing units 112, 122, and 132, an image search solution providing unit 114, AR solution providing units 124 and 134, a content database (DB) 126, and an location based service (LBS)/advertisement solution providing unit 136.

The image search service unit 110 may receive an image search service request and service information from a user equipment 190 and provide the requested image search service. The service information may include information on a target image to search for. Since the image search service unit 110 requires an image search solution and an image recognition solution, the image search service unit 110 may request the image recognition solution providing unit 112 and the image search solution providing unit 114 to perform related functions to generate the image search solution and the image recognition solution. The image recognition solution providing unit 112 may perform an image recognition function based on the service information received from the image search service unit 110. As the image recognition solution, the image recognition solution providing unit 112 may return a result of the image recognition function to the image search service unit 110. The image search solution providing unit 114 may receive the image parameters from the image recognition solution providing unit 112 through the image search service unit 110. The image search solution providing unit 114 may perform an image search function based on the image parameters and return a result of the image search function, as an image search solution, to the image search service unit 110. The image search service unit 110 may provide the image search service to the user equipment 190 based on the image search solution and the image recognition solution received from the image recognition solution providing unit 112 and the image search solution providing unit 114.

The AR service unit 120 may provide an AR service to the user equipment 190. Since the AR service unit 120 may require an image recognition solution and an AR solution, the AR service unit 120 may request the image recognition solution providing unit 112 and the AR solution providing unit 124. The image recognition solution providing unit 112 and the AR solution providing unit 124 may perform corresponding functions and return results of the corresponding functions, as the image recognition solution and the AR solution, to the AR service unit. The AR service unit 120 may receive the image recognition solution and the AR solution and provide the AR service to the user equipment 190.

The AR advertisement service unit 130 may provide an AR advertisement service to the user equipment 190. Since the AR advertisement service unit 130 may require an image recognition solution, an AR solution, and an LBS/advertisement solution, the AR advertisement service unit 130 may request the image recognition solution providing unit 132, the AR solution providing unit 134, and the LBS/advertisement solution providing unit 136 to provide required solutions. The image recognition solution providing unit 132, the AR solution providing unit 134, and the LBS/advertisement solution providing unit 136 may perform corresponding functions and return results of the corresponding functions, as the required solutions, to the AR advertisement service unit 130. The AR advertisement service unit 130 may provide the AR advertisement service based on the image recognition solution, the AR solution, and the LBS/advertisement solution.

As described above, the image search service unit 110, the AR service unit 120, and the AR advertisement service unit 130 may commonly require the image recognition solution for providing the image search service, the AR service, and the AR advertisement service. Each one of the service units 110, 120, and 130, however, uses a dedicated solution providing unit 112, 122, or 132 for the same image recognition solution. Furthermore, the service units 110, 120, and 130 may exchange the same information with corresponding solution providing units 112, 122, and 132 for obtaining the same image recognition solution. Such a manner of using the solution providing unit may waste resources in a cloud computing environment.

Hereinafter, operations of the related system 100 will be described, in detail, with respect to each service. In the case of an image search service, the user equipment 190 may access the image search service unit 110. Since the image search service may require an image recognition solution and an image search solution, the image search service unit 110 may access the image recognition solution providing unit 112 and the image search solution providing unit 114. For example, the image search service unit 110 may receive an image search service request from the user equipment 190. The image search service unit 110 may receive image data input from the user equipment 190 and transmit the received image data to the image recognition solution providing unit 112. The image recognition solution providing unit 112 may extract image parameters from the received image data and transmit the extracted image parameters, as the image recognition solution, to the image search service unit 110. Then, the image search service unit 110 may transmit the received image parameters to the image search solution providing unit 114. The image search solution providing unit 114 may search the content DB 126 and return the search results as the image search solution to the image search service unit 110. The image search service unit 110 may transmit the received search results to the user equipment 190.

In the case of an AR service, the user equipment 190 may access an AR service unit 120. Since the AR service may require an image recognition solution and an AR solution, the AR service unit 120 may access the image recognition solution providing unit 122, the AR solution providing unit 124, and the content DB 126. For example, the AR service unit 120 may receive an AR service request from the user equipment 190. The AR service unit 120 may receive image data from the user equipment 190 and transmit the received image data to the image recognition solution providing unit 122. The image recognition solution providing unit 122 may extract image parameters from the received image data and transmit the extracted image parameters to the AR service unit 120. The AR service unit 120 may search the content DB 126 for contents necessary to provide the requested AR service based on the received image parameters. The AR service unit 120 may transmit the received image data and the searched contents to the AR solution providing unit 124. The AR solution providing unit 124 may combine the received image data and the contents and return the results with control data to the AR service unit 120. The AR service unit 120 may transmit the received results to the user equipment 190.

In the case of an AR advertisement service, the user equipment 190 may access the AR advertisement service unit 130. Since the AR advertisement service unit 130 may require an image recognition solution, an AR solution, and an LBS/advertisement solution, the AR advertisement service unit 130 may access the image recognition solution providing unit 132, the AR solution providing unit 134, and the LBS/advertisement solution providing unit 136. For example, the AR advertisement service unit 130 may receive an AR advertisement service request including location information and image data from the user equipment 190. The AR advertisement service unit 130 may transmit the received image data to the image recognition solution providing unit 132. The image recognition solution providing unit 132 may extract image parameters from the received image data and transmit the extracted image parameters as the image recognition solution to the AR advertisement service unit 130. The AR advertisement service unit 130 may transmit the received image parameters and the received location information to the LBS/advertisement solution providing unit 136. The LBS/advertisement solution providing unit 136 may retrieve advertisement contents based on the location information and the image parameters and transmit the advertisement contents to the AR advertisement service unit 130. The AR advertisement service unit 130 may transmit the received advertisement contents and the received image data to the AR solution providing unit 134. The AR solution providing unit 134 may combine the received image data and the advertisement contents and return the results with control data to the AR advertisement service unit 130. The AR advertisement service unit 130 may transmit the received results to the user equipment 190.

As described above, the service units 110, 120, and 130 may redundantly require the same solution providing units 112, 122, and 132 or 124 and 134 for providing different services requiring the same solution. Such a manner of using the solution providing units may waste resources in a cloud computing environment.

In accordance with an embodiment of the present invention, a system 200 may provide a cloud computing service in a cloud computing environment. Unlike the related system 100 of FIG. 1, the system 200 may share at least one solution providing unit for providing different services requiring the same or similar solutions.

Figure 2:
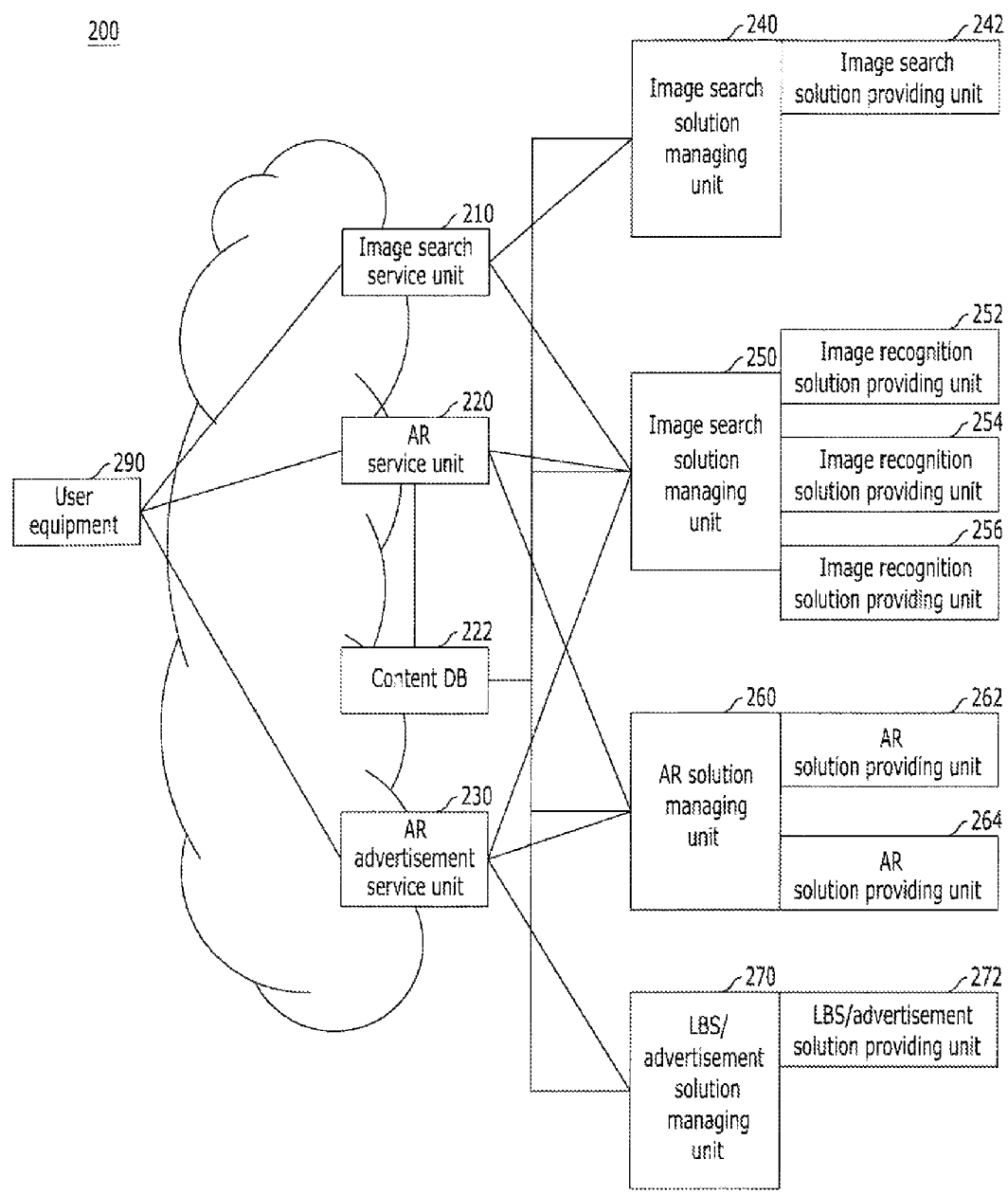
FIG. 2 illustrates a system for providing a service by sharing a solution providing unit in a cloud computing environment, in accordance with an embodiment of the present invention.

FIG. 2 illustrates a system for providing a service by sharing at least one solution providing unit in a cloud computing environment, in accordance with an embodiment of the present invention.

Referring to FIG. 2, the system 200 may include a plurality of service units 210, 220, and 230 and a plurality of solution managing units 240, 250, 260 and 270. The service units 210, 220, and 230 and the solution managing units 240, 250, 260 and 270 may each be a virtual machine created in a cloud computing environment according to user demand, but the present invention is not limited thereto. The service units 210, 220, and 230 and the solution managing units 240, 250, 260 and 270 may be hardware computing devices coupled to a cloud computing system through a network. The system 200 may further include a content database (DB) 222.

The service units 210, 220, and 230 may receive service requests from a plurality of user equipments and provide the requested services to the plurality of user equipments by sharing at least one solution providing unit generating a same solution for different services through a related solution managing unit. For example, a user equipment 290 may transmit a service request for a desired service to one of the service units 210, 220, and 230. When the user equipment 290 transmits the service request, the user equipment 290 may transmit service information with the service request. The service information may be information necessary for using the desired service. The service information may include image data and Internet protocol (IP) addresses of a user equipment and a service unit. In the case of the image search service, the service information may include an image data. The user equipment 290 may store such an image data, or receive the image data from another device through a network. Furthermore, the user equipment 290 may capture a target image using a camera module and transmit the captured image to the at least one service unit as the service information.

Particularly, the system 200 may include an image search service unit 210, an AR service unit 220, and an AR advertisement service unit 230, but the present invention is not limited thereto. The image search service unit 210, the AR service unit 220, and the AR advertisement service unit 230 may have a similar configuration and perform similar functions as compared to the image search service unit 110, the AR service unit 120, and the AR advertisement service unit 130 of FIG. 1. Accordingly, more detailed descriptions thereof will be omitted here. The image search service unit 210, the AR service unit 220, and the AR advertisement service unit 230 will be described based on distinguishing functions and configurations.

As described above, the image search service unit 210 may provide an image search service to a plurality of user equipments. The AR service unit 220 may provide an AR service and the AR advertisement service unit 230 may provide an AR advertisement service to a plurality of user equipments such as the user equipment 290. The image search service, the AR service, and the AR advertisement service may require a same solution such as an image recognition solution and an AR solution. Accordingly, the image search service unit 210, the AR service unit 220, and the AR advertisement service unit 230 may share an image recognition solution providing unit 252 and an AR solution providing unit 262. That is, the image recognition solution providing unit 252 and the AR solution providing unit 262 may be commonly used by the image search service unit 210, the AR service unit 220, and the AR advertisement service unit 230 through an image recognition solution managing unit 250 and an AR solution managing unit 260.

In order to share at least one solution providing unit, each one of the image search service unit 210, the AR service unit 220, and the AR advertisement service unit 230 may determine which solutions are required to provide the requested services. Based on the determined solutions, each one of the image search service unit 210, the AR service unit 220, and the AR advertisement service unit 230 may select required solution managing units. Then, each one of the image search service unit 210, the AR service unit 220, and the AR advertisement service unit 230 may transmit a solution request and the service information to the selected solution managing units. Thereafter, each one of the image search service unit 210, the AR service unit 220, and the AR advertisement service unit 230 may receive the requested solutions from the selected solution managing units. Each one of the image search service unit 210, the AR service unit 220, and the AR advertisement service unit 230 may process the received solutions and provide the requested service to the plurality of user equipments, for example, to the user equipment 290.

In accordance with an embodiment of the present invention, the system 200 may further include an image search solution managing unit 240, an image recognition solution managing unit 250, an AR solution managing unit 260, and an LBS/advertisement solution managing unit 270. As described above, each one of the image recognition solution managing unit 250, the AR solution managing unit 260, and the LBS/advertisement solution managing unit 270 may receive solution requests from the service units 210, 220, and 230. Each one of the image recognition solution managing unit 250, the AR solution managing unit 260, and the LBS/advertisement solution managing unit 270 may provide the requested solutions to the service units 210, 220, and 230 by sharing at least one solution providing unit generating a same solution required for different services. That is, at least one solution providing unit may be commonly used to provide different services. In accordance with an embodiment of the present invention, the system 200 does not use a dedicated solution providing unit for each service unit.

In order to share one of the solution providing units, each one of the image recognition solution managing unit 250, the AR solution managing unit 260, and the LBS/advertisement solution managing unit 270 may manage corresponding solution providing units according to a service demand. For example, each one of the image recognition solution managing unit 250, the AR solution managing unit 260, and the LBS/advertisement solution managing unit 270 may select a corresponding solution providing unit based on processing loads of each solution providing unit. Furthermore, each one of the image recognition solution managing unit 250, the AR solution managing unit 260, and the LBS/advertisement solution managing unit 270 may select a corresponding solution providing unit based on locations thereof when the solution providing units are hardware computing devices coupled to the system 200. Alternatively, the solution managing units 240, 250, 260, and 270 may create a solution providing unit when there is no existing solution providing unit or when every solution providing unit exceeds a certain processing load.

The image search solution managing unit 240 may manage at least one image search solution providing unit 242. The image search solution providing unit 242 may be a virtual machine created to perform an image search function. As described above, the image search solution managing unit 240 may dynamically manage image search solution providing units according to a service demand. For example, the image search solution managing unit 240 may select an existing image search solution providing unit or create a new image search solution providing unit according to service demands of the service units. For example, the image search solution managing unit 240 may receive multiple requests from a plurality of different service units for providing different types of services requiring the same solution, for example, an image search solution. In this case, the image search solution managing unit 240 may provide image search solutions by sharing at least one image search solution providing unit 242.

The image recognition solution managing unit 250 may manage at least one image recognition solution providing units 252, 254, and 256. The image recognition solution providing units 252, 254, and 256 may each be a virtual machine created to perform an image recognition function. As described above, the image recognition solution managing unit 250 may dynamically manage the image recognition solution providing units 252, 254, and 256 according to a service demand. For example, the image recognition solution managing unit 250 may select one of existing image recognition solution providing units 252, 254, and 256 or create a new image recognition solution providing unit according to service demands of the service units. For example, the image recognition solution managing unit 250 may receive multiple requests from a plurality of different service units 210, 220, and 230 for providing different services requiring the same solution. The image recognition solution managing unit 250 may provide the same solution such as an image recognition solution for the image search service, the AR service, and the AR advertisement service. In this case, the image recognition solution managing unit 250 may share at least one of the image recognition solution providing units 252, 254, and 256 for providing the image recognition solution.

The AR solution managing unit 260 may manage at least one of the AR solution providing units 262 and 264. The AR solution providing units 262 and 264 may each be a virtual machine created to perform an AR function for generating an AR solution. As described above, the AR solution managing unit 260 may dynamically manage the AR solution providing units 262 and 264 according to a service demand. For example, the AR solution managing unit 260 may select one of existing AR solution providing units 262 and 264 or create a new AR solution providing unit according to service demands of the service units. For example, the AR solution managing unit 260 may receive multiple requests from a plurality of different service units 220 and 230 for providing different services, for example, the AR service and the AR advertisement service. In this case, the AR solution managing unit 260 may share at least one of the AR solution providing units 262 and 264 for providing the AR solution.

The LBS/advertisement solution managing unit 270 may manage at least one LBS/advertisement solution providing unit 272. The LBS/advertisement solution providing unit 272 may be a virtual machine created to perform an LBS/advertisement function that generates an LBS/advertisement solution. The LBS/advertisement solution may be advertisement contents selected from the content DB 222 based on a current location of the user equipment 290. As described above, the LBS/advertisement solution managing unit 270 may dynamically manage the LBS/advertisement solution providing unit 272 according to a service demand. For example, the LBS/advertisement solution managing unit 270 may select the existing LBS/advertisement solution providing unit 272 or create a new LBS/advertisement solution providing unit according to service demands of the service units. For example, the LBS/advertisement solution managing unit 270 may receive multiple requests from a plurality of different service units for providing different services requiring at least one same solution. In this case, the LBS/advertisement solution managing unit 270 may provide LBS/advertisement solutions by sharing at least one LBS/advertisement solution providing unit 272.

Hereinafter, operations of the image recognition solution managing unit 250, the AR solution managing unit 260, and the LBS/advertisement solution managing unit 270 will be described in more detail. In the case of an image search service, the image search solution managing unit 240 and the image recognition solution managing unit 250 may receive the solution requests from the image search service unit 210 with the target image data which is received from the user equipment 290. Each one of the image search solution managing unit 240 and the image recognition solution managing unit 250 may select one of corresponding solution providing units based on processing loads of each solution providing unit. The image search solution managing unit 240 and the image recognition solution managing unit 250 may transmit a solution request and the service information to the selected solution providing units, respectively. The image search solution managing unit 240 and the image recognition solution managing unit 250 may receive solutions from the selected solution providing units, respectively. The solutions may be a result of performing the requested functions at the selected solution providing units. The image search solution managing unit 240 and the image recognition solution managing unit 250 process the received solutions and provide the processing results to a corresponding service unit.

When an AR service is requested to the AR service unit 220, the image recognition solution managing unit 250 and the AR solution managing unit 260 may be selected to provide the AR service solution to the AR service unit 220. When an AR advertisement service is requested to the AR advertisement service unit 230, the image recognition solution managing unit 250, the AR solution managing unit 250, and the LBS/advertisement solution managing unit 270 may be selected to provide the AR advertisement solution to the AR advertisement service unit 230. The AR advertisement solution may be advertisement contents with control data. A user equipment may control output devices in response to the control data. For example, a vibration module of a user equipment may be vibrated for a certain time period in response to the control data.

As described above, different types of services requiring at least one same solution may be provided by sharing at least one solution providing unit through a corresponding solution managing unit. For example, the image recognition solution providing unit 252 may be commonly used to provide the image search service, the AR service, and the AR advertisement service. That is, the system 200 in accordance with an embodiment of the present invention may share one solution providing unit for providing different services. Accordingly, the system 200 in accordance with an embodiment of the present invention may effectively utilize cloud computing resources to provide the requested service in a cloud computing environment.

Hereinafter, a method for providing a service by sharing at least one solution providing unit through solution managing units, in accordance with an embodiment of the present invention, will be described with reference to FIG. 3.

Figure 3:
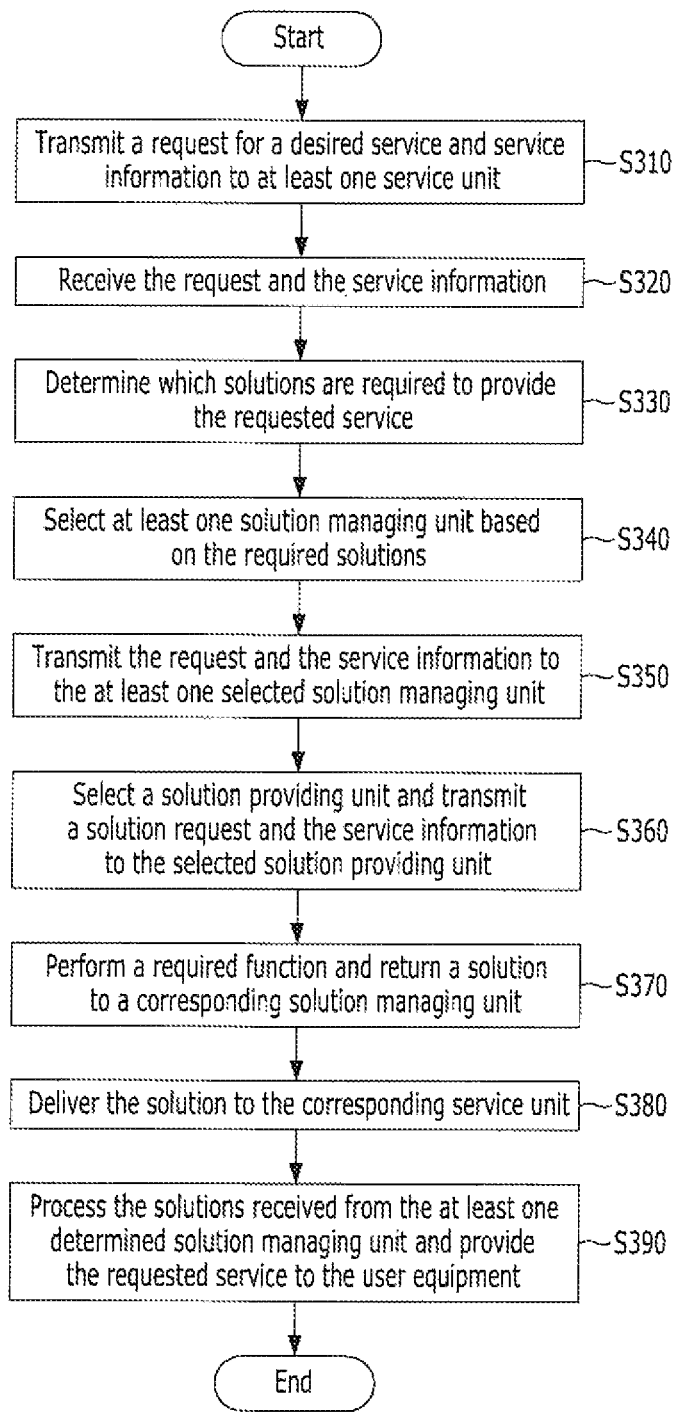
FIG. 3 illustrates a method for providing a service by sharing at least one solution providing unit in a cloud computing environment, in accordance with an embodiment of the present invention.

FIG. 3 illustrates a method for providing a service by sharing at least one solution providing unit in a cloud computing environment, in accordance with an embodiment of the present invention.

Referring to FIG. 3, a request for a desired service may be transmitted with service information to at least one service unit S310. For example, the user equipment 290 may transmit a request for a desired service to one of the service units 210, 220, and 230. In the case of an image search service, the user equipment 290 may transmit a request for the image search service to the image search unit 210. When the user equipment 290 transmits the request, the user equipment 290 may transmit a target image data as the service information. The target image data may be received from a user through a network and stored in the user equipment 290. Alternatively, the target image data may be captured using a camera module of the user equipment 290, but the present invention is not limited thereto.

The request and the service information may be received S320. For example, the image search service unit 210 may receive the request and the target image data as the service information from the user equipment 290. Then, solutions required for the requested service may be determined based on the request and the service information S330. For example, the image search unit 210 may determine which solutions are required to provide the image search service. In this case, the image search unit 210 may determine that an image recognition solution and an image search solution are required for the image search service.

At least one solution managing unit may be selected based on the required solutions S340. For example, the image search unit 210 may select the image search solution managing unit 240 and the image recognition solution managing unit 250 based on the required solutions, for example, the image recognition solution and the image search solution.

The request and the service information may be transmitted to the at least one selected solution managing unit S350. For example, the image search service unit 210 may transmit the request and the service information to the image search solution managing unit 240 and the image recognition solution managing unit 250, but the present invention is not limited thereto. The image search service unit 210 may transmit a request and image parameters to the image search solution managing unit 240 after receiving the image parameters from the image recognition solution managing unit 250 as a result of the image recognition solution.

A solution providing unit may be selected and a solution request and the service information may be transmitted to the selected solution providing unit S360. For example, the image search solution managing unit 240 may select the image search solution providing unit 242 and transmit a solution request and the service information received from the user equipment 290 to the image search solution providing unit 242. The image recognition solution managing unit 250 may select one of the image recognition solution providing units 252, 254, and 256 based on a processing load of each image recognition solution providing unit. After selection, the image recognition solution managing unit 250 may transmit a solution request and the service information. The present invention, however, is not limited thereto. The solution managing unit may create a new corresponding solution providing unit.

A required function may be performed and a result of performing the function may be returned to a corresponding solution managing unit S370. For example, the image recognition solution providing unit 252 may perform an image recognition function based on the service information, for example, the target image data, and return image parameters as the result of performing the image recognition function to the image recognition solution managing unit 250. The result of performing the image recognition function may be the image recognition solution. The image recognition solution managing unit 250 may transmit the result of the image recognition function to the image search solution managing unit 240 through the image search service unit 210 or directly to the image search solution managing unit 240. Furthermore, the image search solution providing unit 242 may perform the image search function based on the image parameter received from the image recognition solution managing unit 250. After performing the image search function, the image search solution providing unit 242 may return a result of the image search function, as a solution, to the image search solution managing unit 240.

The solution may be delivered to the corresponding service unit S380. For example, the image search solution managing unit 240 and the image recognition solution managing unit 250 may return the solutions received from the image search solution providing unit 242 and the image recognition solution managing unit 250 to the image search service unit 210.

At least one solution received from the at least one determined solution managing unit may be processed and the requested service may be provided to the user equipment based on the solution processing result S390. For example, the image search service unit 210 may process the solutions from the image search solution managing unit 240 and the image recognition solution managing unit 250 and provide the requested image search service to the user equipment 290.

Hereinafter, a method in accordance with an embodiment of the present invention will be described based on an example with reference to FIG. 4 through FIG. 11. Particularly, when a user desires an AR advertisement service, the system 200 in accordance with an embodiment of the present invention may provide the AR advertisement service through operations described below.

Figure 4:
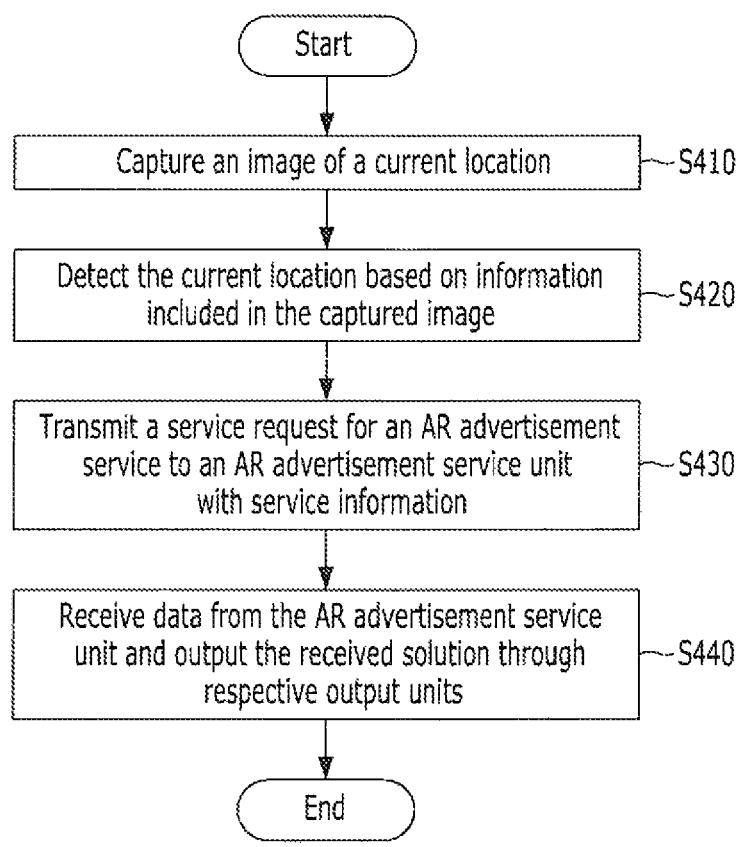
FIG. 4 illustrates operations of a user equipment in a method for providing an AR advertisement service by sharing at least one solution providing unit, in accordance with an embodiment of the present invention.

FIG. 4 illustrates operations of a user equipment in a method for providing an AR advertisement service by sharing at least one solution providing unit, in accordance with an embodiment of the present invention.

Referring to FIG. 4, when a user desires to use an AR advertisement service, a user equipment 290 may capture an image of a current location S410 and the user equipment 290 may detect the current location based on information included in the captured image of the current location S420. The user equipment 290 may transmit an AR advertisement service request to an AR advertisement service unit 230 with service information including the information on the current location through a network S430.

The user equipment 290 may receive data from the AR advertisement service unit 230 and output the data through respective output units S440. The data may be AR advertisement service data generated based on solutions generated through corresponding solution providing units. The data may include an advertisement image, audio data, and AR control data. In this case, the user equipment 290 may display the advertisement image on a display module, output the audio data through a speaker, and control related modules for augmented reality.

Figure 5:
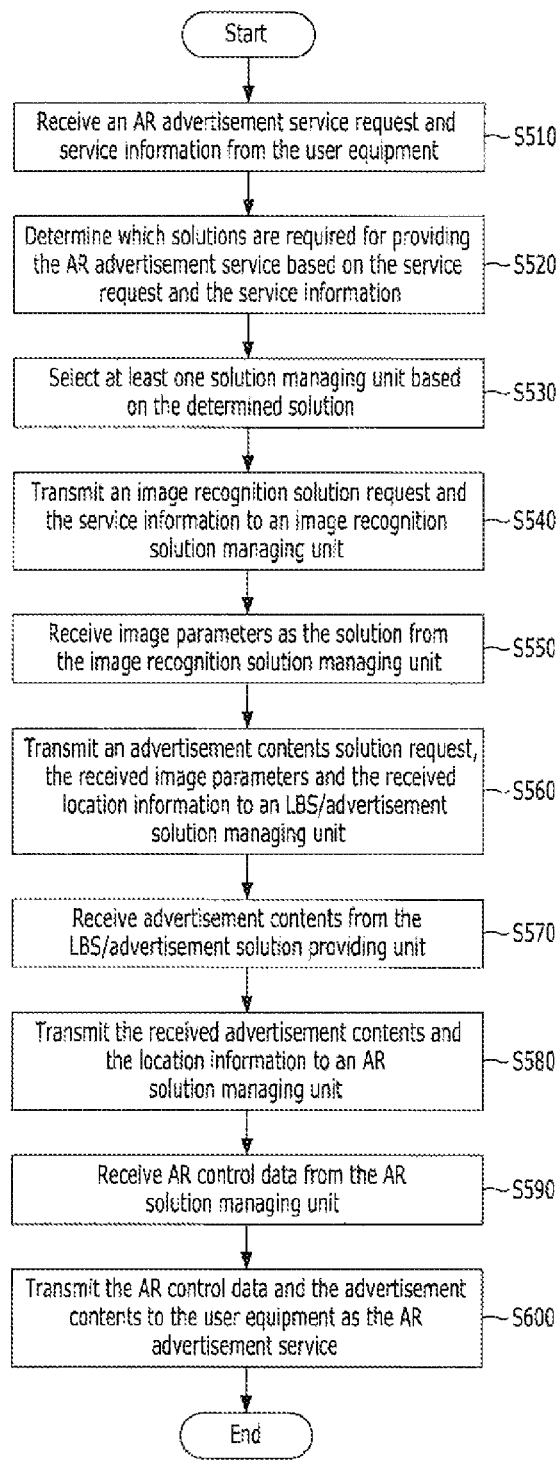
FIG. 5 illustrates operations of an AR advertisement service unit in a method for providing an AR advertisement service by sharing at least one solution providing unit, in accordance with an embodiment of the present invention.

FIG. 5 illustrates operations of an AR advertisement service unit in a method for providing an AR advertisement service by sharing at least one solution providing unit, in accordance with an embodiment of the present invention.

Referring to FIG. 5, the AR advertisement service unit 230 may receive the AR advertisement service request and the service information from the user equipment 290 S510. For example, the service information may include information on the current location of the user equipment 290. Such information may be a captured image of the current location of the user equipment 290.

The AR advertisement service unit 230 may determine which solutions are required for providing the AR advertisement service based on the service request and the service information including the information on the current location of the user equipment 290 S520. The AR advertisement service unit 230 may select at least one solution managing unit based on the determined function S530. For example, the AR advertisement service unit 230 may select the image recognition solution managing unit 250, the AR solution managing unit 260, and the LBS/advertisement solution managing unit 270 based on the determined solutions.

The AR advertisement service unit 230 may transmit an image recognition solution request and the service information such as a captured image to the image recognition solution managing unit 250 S540. The AR advertisement service unit 230 may receive image parameters as the solution from the image recognition solution managing unit 250 S550.

Then, the AR advertisement service unit 230 may transmit an advertisement contents solution request, the image parameters received from the image recognition solution managing unit 250, and the location information received from the user equipment 290 to the LBS/advertisement solution managing unit 270 S560. In response to the advertisement contents solution request, the AR advertisement service unit 230 may receive advertisement contents from the LBS/advertisement solution managing unit 270 S570.

The AR advertisement service unit 230 may transmit the advertisement contents and the location information of the user equipment 290 to the AR solution managing unit 260 S580. The AR advertisement service unit 230 may receive AR control data from the AR solution managing unit 260 S590. The AR advertisement service unit 230 may transmit the AR control data and the advertisement contents to the user equipment 290 as the AR advertisement service S600. For example, the user equipment 290 may display the advertisement contents through a display module and control output devices based on the received AR control data.

Figure 6:
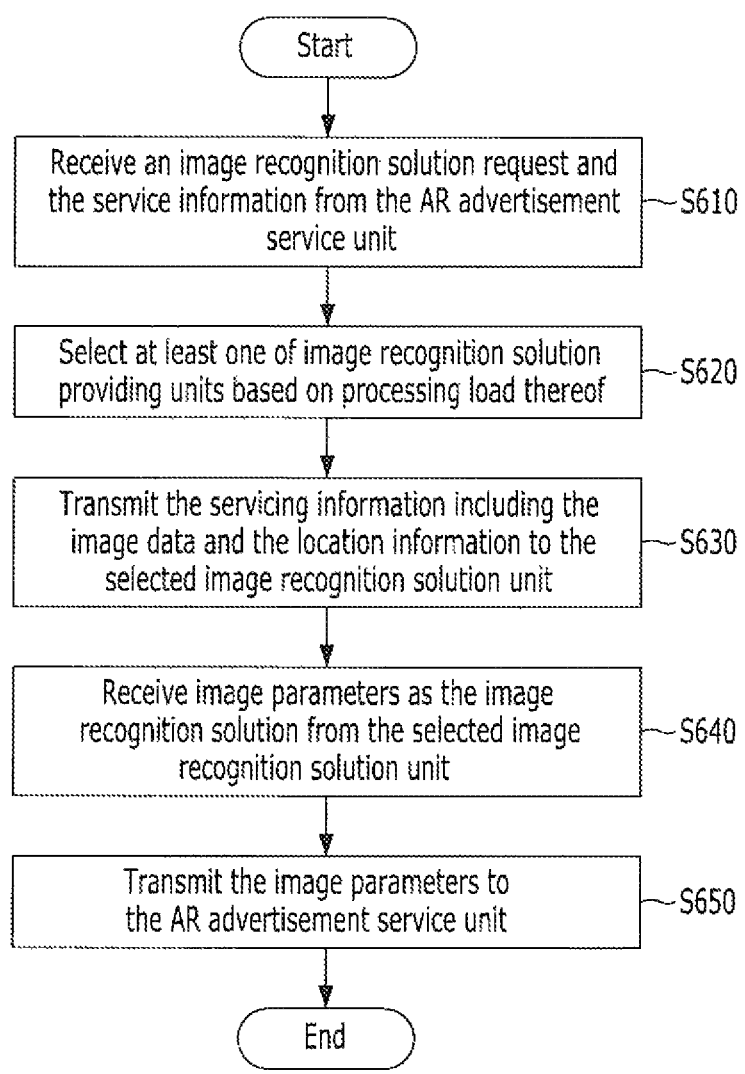
FIG. 6 illustrates operations of an image recognition solution managing unit in a method for providing an AR advertisement service by sharing at least one solution providing unit, in accordance with an embodiment of the present invention.

FIG. 6 illustrates operations of an image recognition solution managing unit in a method for providing an AR advertisement service by sharing at least one solution providing unit, in accordance with an embodiment of the present invention.

Referring to FIG. 6, the image recognition solution managing unit 250 may receive an image recognition solution request and the service information from the AR advertisement service unit 230 S610. The service information may include a captured image and location information such as a current location of the user equipment 290. The image recognition solution managing unit 250 may select at least one of the image recognition solution providing units 252, 254, and 256 based on processing load thereof S620. The image recognition solution managing unit 250 may transmit the servicing information including the image data and the location information to the selected image recognition solution providing unit S630.

The image recognition solution managing unit 250 may receive image parameters as the image recognition solution from the selected image recognition solution providing unit S640. The image recognition solution managing unit 250 may transmit the image parameters to the AR advertisement service unit 230 S650. Thereafter, the image recognition solution managing unit 250 may wait for receiving an image recognition solution request from another service unit.

Figure 7:
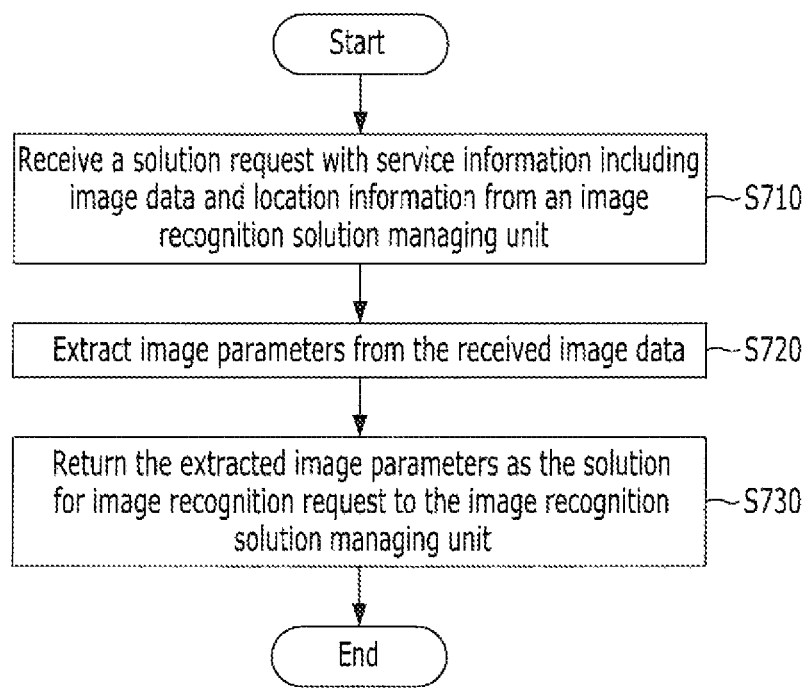
FIG. 7 illustrates operations of an image recognition solution providing unit in a method for providing an AR advertisement service through sharing at least one solution providing unit, in accordance with an embodiment of the present invention.

FIG. 7 illustrates operations of an image recognition solution providing unit in a method for providing an AR advertisement service through sharing at least one solution providing unit, in accordance with an embodiment of the present invention.

Referring to FIG. 7, the image recognition solution providing unit 252 may be selected by the image recognition solution managing unit 250 as described above. The image recognition solution providing unit 252 may receive the solution request with the service information including the image data and the location information from the image recognition solution managing unit 250 S710. The image recognition solution providing unit 252 may extract image parameters from the received image data S720 and return the extracted image parameters as the solution for image recognition request to the image recognition solution managing unit 250 S730.

Figure 8:
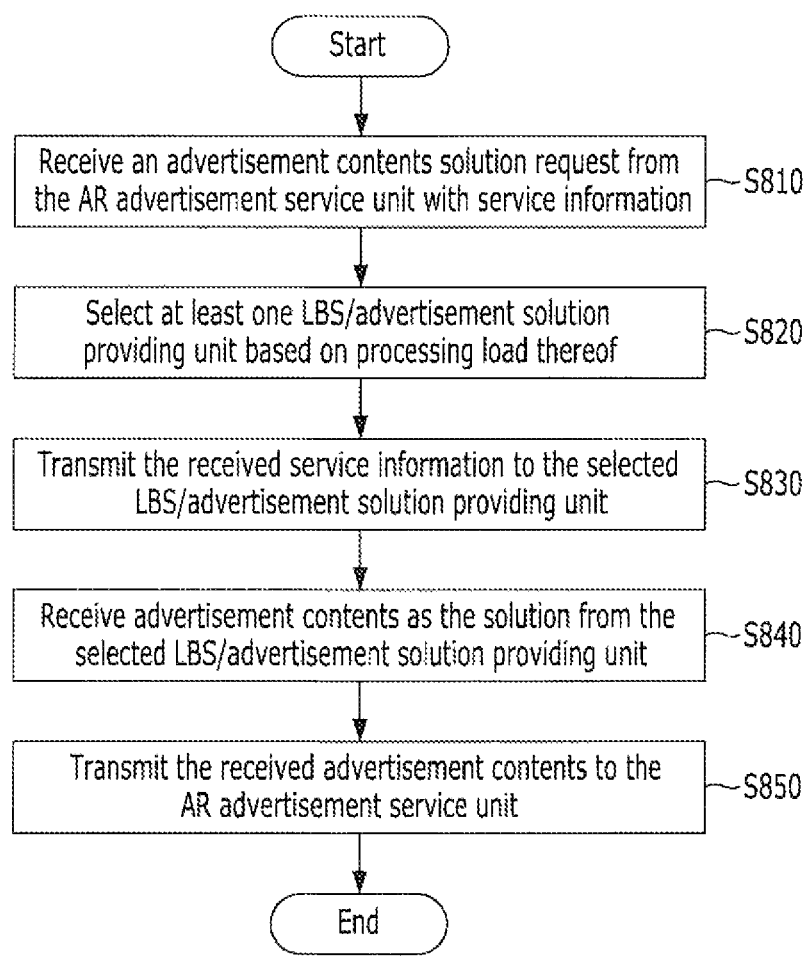
FIG. 8 illustrates operations of an LBS/advertisement solution managing unit in a method for providing an AR advertisement service through sharing at least one solution providing unit, in accordance with an embodiment of the present invention.

FIG. 8 illustrates operations of an LBS/advertisement solution managing unit in a method for providing an AR advertisement service through sharing at least one solution providing unit, in accordance with an embodiment of the present invention.

Referring to FIG. 8, an LBS/advertisement solution managing unit 270 may receive an advertisement contents solution request from the AR advertisement service unit 230 with the service information S810. The LBS/advertisement solution managing unit 270 may select at least one LBS/advertisement solution providing unit based on processing loads thereof S820. The LBS/advertisement solution managing unit 270 may transmit the received service information and the image parameters to the selected LBS/advertisement solution providing unit 272 S830. The LBS/advertisement solution managing unit 270 may receive advertisement contents as the solution from the selected LBS/advertisement solution providing unit 272 S840.

The LBS/advertisement solution managing unit 270 may transmit the received advertisement contents to the AR advertisement service unit 230 S850. Thereafter, the LBS/advertisement solution managing unit 270 may wait to receive an LBS/advertisement solution request from another service unit.

Figure 9:
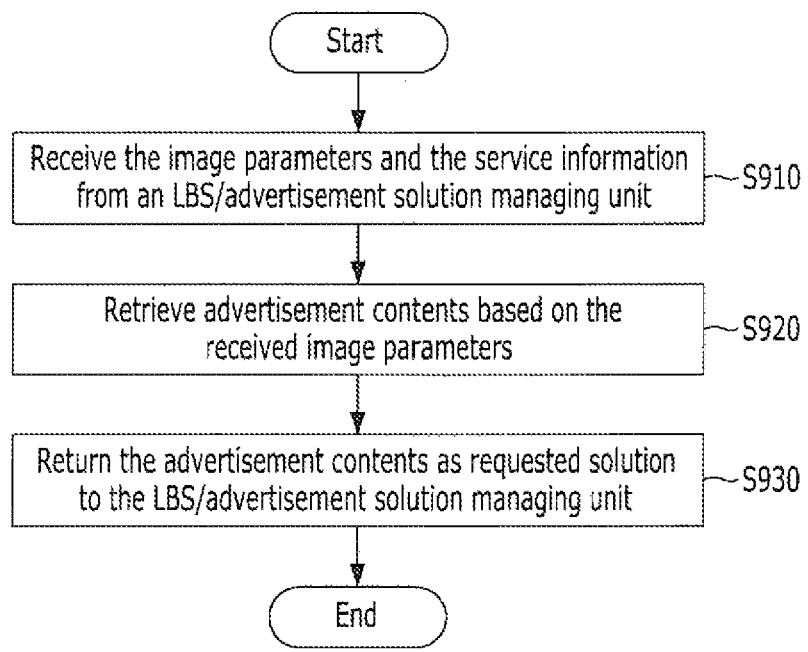
FIG. 9 illustrates operations of an LBS/advertisement solution providing unit in a method for providing an AR advertisement service through sharing at least one solution providing unit, in accordance with an embodiment of the present invention.

FIG. 9 illustrates operations of an LBS/advertisement solution providing unit in a method for providing an AR advertisement service through sharing at least one solution providing unit, in accordance with an embodiment of the present invention.

Referring to FIG. 9, the LBS/advertisement solution managing unit 270 may select an LBS/advertisement solution providing unit 272 as described above. The LBS/advertisement solution providing unit 272 may receive the image parameters and the service information including the location information from the LBS/advertisement solution managing unit 270 S910. The LBS/advertisement solution providing unit 272 may retrieve advertisement contents based on the received image parameters S920. The LBS/advertisement solution providing unit 272 may return the advertisement contents as the requested solution to the LBS/advertisement solution managing unit 270 S930. Thereafter, the LBS/advertisement solution providing unit may wait to receive another LBS/advertisement solution request.

Figure 10:
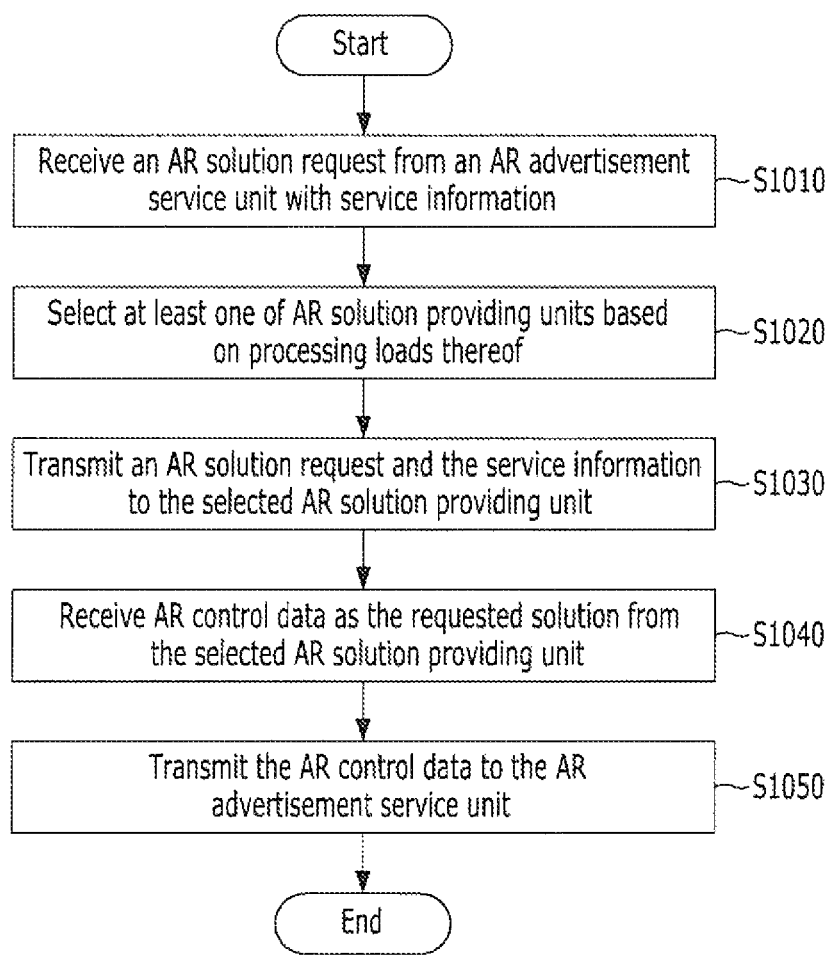
FIG. 10 illustrates operations of an AR solution managing unit in a method for providing an AR advertisement service through sharing at least one solution providing unit, in accordance with an embodiment of the present invention.

FIG. 10 illustrates operations of an AR solution managing unit in a method for providing an AR advertisement service through sharing at least one solution providing unit, in accordance with an embodiment of the present invention.

Referring to FIG. 10, the AR solution managing unit 260 may receive an AR solution request from the AR advertisement service unit 230 with the service information S1010. The AR solution managing unit 260 may select at least one of AR solution providing units 262 and 264 based on processing loads thereof S1020. The AR solution managing unit 260 may transmit an AR solution request and the service information to the selected AR solution providing unit S1030.

The AR solution managing unit 260 may receive AR control data as the requested solution from the selected AR solution providing unit S1040. The AR solution managing unit 260 may transmit the AR control data to the AR advertisement service unit 230 S1050. Thereafter, the AR solution managing unit 260 may wait for receiving an AR solution request from another service unit.

Figure 11:
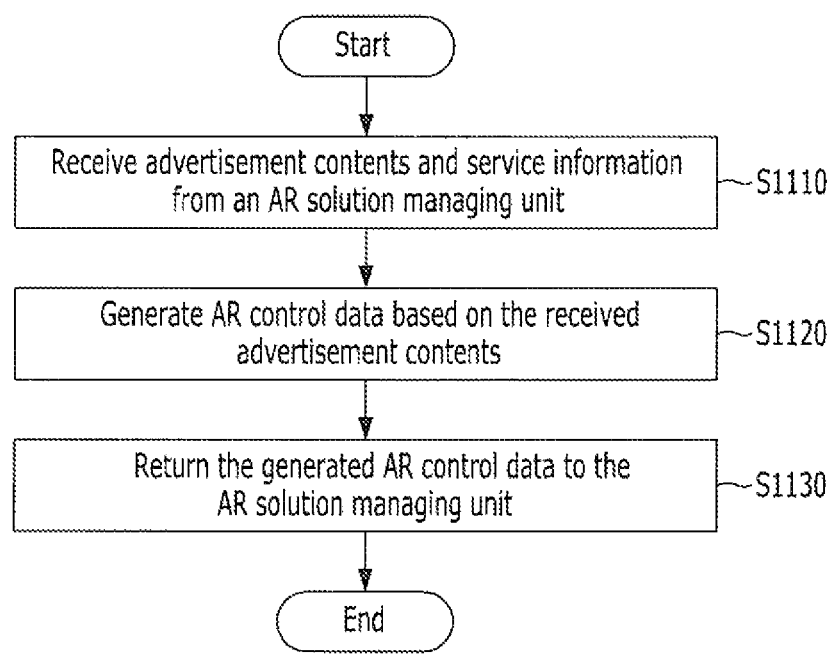
FIG. 11 illustrates operations of an AR solution providing unit in a method for providing an AR advertisement service through sharing at least one solution providing unit, in accordance with an embodiment of the present invention.

FIG. 11 illustrates operations of an AR solution providing unit in a method for providing an AR advertisement service through sharing at least one solution providing unit, in accordance with an embodiment of the present invention.

Referring to FIG. 11, the AR solution managing unit 260 may select an AR solution providing unit as described above. The selected AR solution providing unit may receive the advertisement contents and the service information from the AR solution managing unit 260 S1110.

The AR solution providing unit 262 may generate AR control data based on the received advertisement contents S1120. The AR solution providing unit may return the generated AR control data to the AR solution managing unit 260 S1130. Thereafter, the AR solution providing unit may wait to receive another AR solution request.

Figure 12:
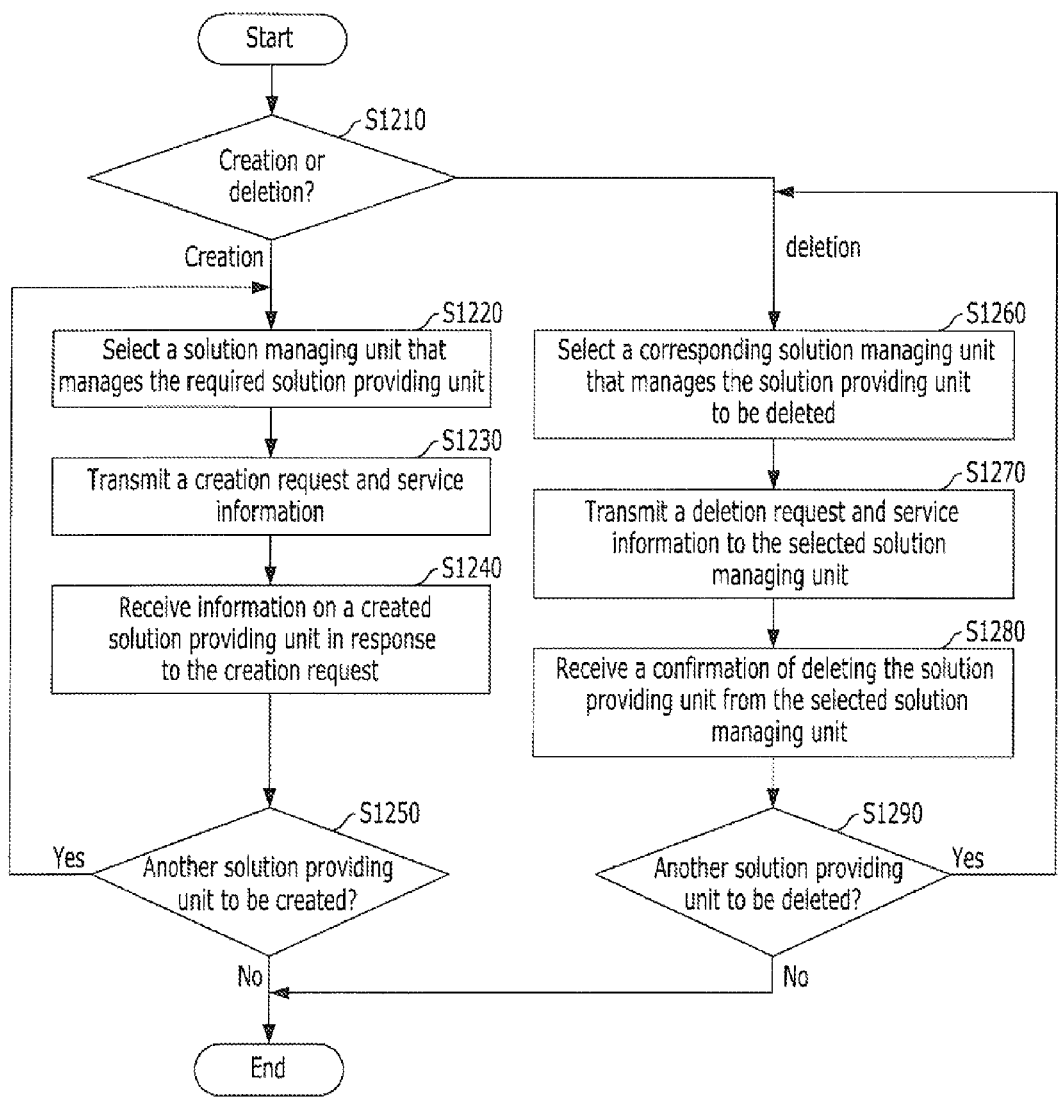
FIG. 12 illustrates operations of a service unit for creating an additional solution providing unit and for deleting one or more existing solution providing units through a corresponding solution managing unit, in accordance with an embodiment of the present invention.

FIG. 12 illustrates operations of a service unit for creating an additional solution providing unit and for deleting an existing solution providing unit through a corresponding solution managing unit, in accordance with an embodiment of the present invention.

Referring to FIG. 12, a service unit may be required to create an additional solution providing unit (S1210—Creation) when a corresponding solution providing unit was not created or when a processing load of an existing solution providing unit exceeds a certain level. In this case, the service unit may select a solution managing unit that manages the required solution providing unit S1220. The service unit may transmit a creation request and service information including location information to the selected solution managing unit in order to request the creation of a required solution providing unit S1230. Then, the service unit may receive information on a created solution providing unit from the corresponding solution managing unit in response to the creation request S1240. When there is another solution providing unit to be created (S1250—Yes), the service unit may repeat the above procedure.

On the contrary, the service unit may be required to delete an existing solution providing unit (S1210—Deletion). The service unit may delete one of the existing solution providing units when a request of a corresponding solution has not been received for a certain time period. The service unit may select a corresponding solution managing unit that manages a solution providing unit to be deleted S1260. The service unit may transmit a deletion request and service information to the selected solution managing unit S1270. The deletion request may include information on a solution providing unit to be deleted. Then, the service unit may receive a confirmation of deleting the solution providing unit from the selected solution managing unit S1280. When there is another solution providing unit to be deleted (S1290—Yes), the service unit may repeat the above procedure.

Figure 13:
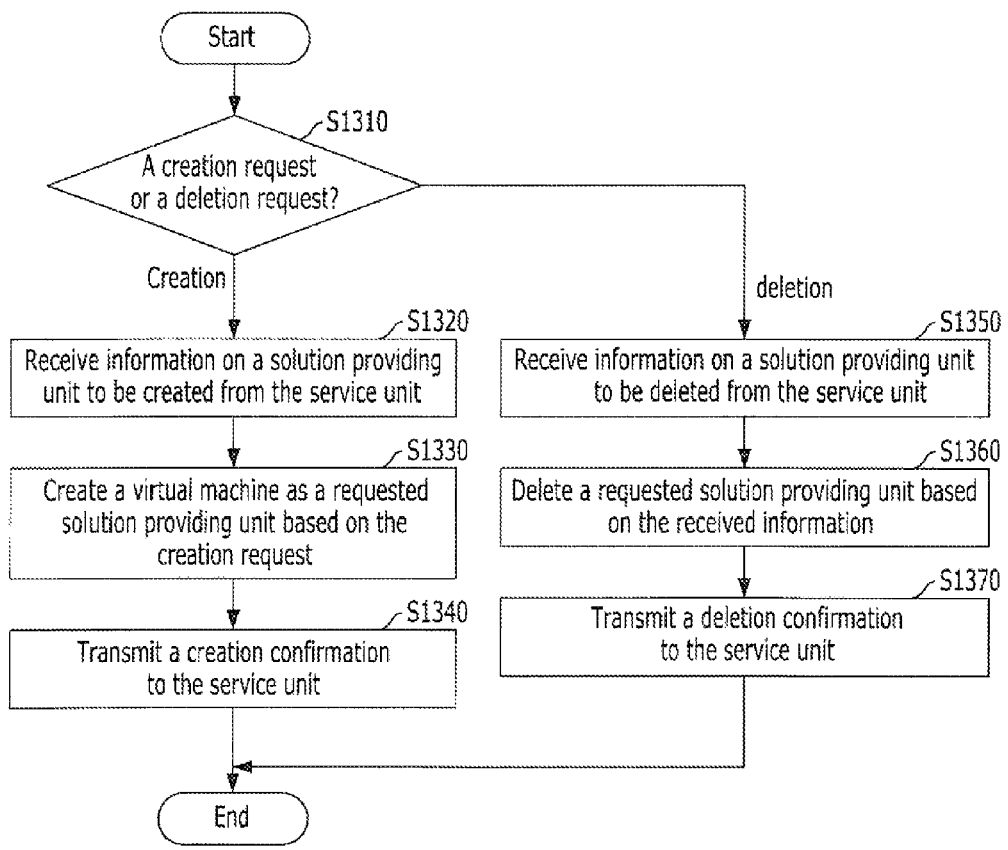
FIG. 13 illustrates operations of a solution managing unit for creating a new or additional solution providing unit and for deleting an existing solution providing unit, in accordance with an embodiment of the present invention.

FIG. 13 illustrates operations of a solution managing unit for creating a new or additional solution providing unit and for deleting an existing solution providing unit, in accordance with an embodiment of the present invention.

Referring to FIG. 13, a solution managing unit may determine whether a received request is a creation request or a deletion request S1310. In the case of the creation request (S1310—Creation), the solution managing unit may receive information on a solution providing unit to be created from a service unit S1320. The creation request may include the service information and information on a location of the service unit. The solution managing unit may create a virtual machine as a requested solution providing unit based on the received information S1330. The solution managing unit may transmit a creation confirmation to the service unit S1340. The creation confirmation may include information on the created solution providing unit. Based on the creation confirmation, the created solution providing unit may be registered at the service unit.

The solution managing unit may instead receive a deletion request from the service unit (S1310—deletion). The solution managing unit may receive information on a solution providing unit to be deleted from the service unit S1350. The deletion request may include service information and information on a location of the service unit. The solution managing unit may delete a requested solution providing unit based on the received information S1360. The solution managing unit may transmit a deletion confirmation to the service unit S1370.

As described above, a requested service may be provided by sharing at least one solution providing unit through a corresponding solution managing unit in accordance with embodiments. For example, the system 200 in accordance with an embodiment of the present invention may commonly use one solution providing unit for providing different services. Unlike the related system, the system in accordance with an embodiment of the present invention does not need to create a dedicated solution providing unit or dedicatedly use one solution providing unit. Accordingly, the system in accordance with an embodiment of the present invention may effectively utilize cloud computing resources to provide the requested service in a cloud computing environment.

Furthermore, the system can dynamically increase and reduce a processing capacity by creating or deleting corresponding solution providing units in response to a service demand. Accordingly, overall performance of providing a requested service may be improved in accordance with an embodiment of the present invention.

Embodiments of the present invention may also be embodied as computer readable codes on a computer readable recording medium. The computer readable recording medium may be any data storage device that can store data which can be thereafter read by a computer system. Examples of the computer readable recording medium include read-only memory (ROM), random-access memory (RAM), CD-ROMs, magnetic tapes, floppy disks, and optical data storage devices. The computer readable recording medium may also be distributed over network coupled computer systems so that the computer readable code is stored and executed in a distributed fashion.

Although embodiments have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A cloud computing system for providing a service in a cloud computing environment, the cloud computing system comprising:
    at least one user equipment configured to provide a user with various types of services including a first service and a second service different from the first service;
    a plurality of service computing devices including a first service computing device configured to provide the first service requiring a first solution to the at least one user equipment and a second service computing device configured to provide the second service requiring a first solution to the at least one user equipment; and
    a plurality of solution managing devices including a first solution managing device configured to provide the first solution by managing at least one of solution providing virtual machines that generates the first solution,
    wherein each service computing device is configured to:
    determine which solutions are required to provide the requested service;
    select solution managing devices each matched with corresponding one of the determined solutions;
    transmit respective solution requests to the selected solution managing devices;
    receive the requested solutions from the selected solution managing devices respectively; and
    provide the requested service to the at least one user equipment by processing the received solutions,
    wherein each solution managing device configured to:
    receive a solution request from at least one of the plurality of service computing devices; and
    provide the requested solution to the at least one service computing device by creating a solution providing virtual machine or selecting at least one solution providing virtual machine previously created to provide a solution to the other service computing device, and
    wherein the first solution managing device is configured to:
    receive a solution request for the first solution from at least one of the first service computing device and the second service computing device;
    select at least one solution providing virtual machine, which are previously created, based on a processing load and a location of each solution providing virtual machine in response to the solution request;
    request the selected at least one solution providing virtual machine to perform a function for generating the first solution;
    receive the first solution from the selected at least one solution providing virtual machine; and
    provide the received first solution to at least one of the first service computing device and the second service computing device.

2. The cloud computing system of claim 1, wherein the solution managing device is configured to:
    create at least one virtual machine as a solution providing virtual machine that performs at least one function for generating the first solution in response to a creation request from at least one of the first and second service computing devices; and
    delete an solution providing virtual machine according to a deletion request from at least one of the first and second service computing devices.

3. The cloud computing system of claim 2, wherein:
    the solution managing device delivers the first solution from the selected at least one solution providing virtual machine to the first service computing device and to the second service computing device; and
    the first service computing device and the second service computing device respectively provide the first service and the second service based on the received first solution delivered from the solution managing device.

4. A method for providing a service by a cloud computing system includes at least one user equipment configured to provide a user with various types of services including a first service and a second service different from the first service, a plurality of service computing devices including a first service computing device configured to provide the first service requiring a first solution to the at least one user equipment and the second service computing device configured to provide a second service requiring the first solution to the at least one user equipment, and a plurality of solution managing devices including a first solution managing device configured to provide the first solution, the method comprising:
    transmitting, by the at least one user equipment, a service request for at least one of the first service and the second service;
    receiving, by at least one of the first service computing device and the second service computing device, the service request for corresponding one of the first service and the second service;
    determining, by at least one of the first service computing device and the second service computing device, which solutions required for providing corresponding one of the first service and the second service based on the received service request;
    selecting, by at least one of the first service computing device and the second service computing device, solution managing devices matched the determined solutions, including the first solution managing device provides the first solution;

performing, by the selected solution managing device, functions to generate the required solutions by one of creating a solution providing virtual machine and selecting at least one solution providing virtual machine previously created to provide the same type of solution to other service computing devices; and providing, by the selected solution managing device, the generated solutions to at least one of the first service computing device and the second service computing device, wherein the first solution managing device is configured to:

receive a solution request for the first solution from at least one of the first service computing device and the second service computing device;

select at least one solution providing virtual machine, which are previously created, based on a processing load and a location of each solution providing virtual machine in response to the solution request;

request the selected at least one solution providing virtual machine to perform a function for generating the first solution;

receive the first solution from the selected at least one solution providing virtual machine; and provide the received first solution to at least one of the first service computing device and the second service computing device.

5. The method of claim 4, wherein each solution managing device selects, based on a processing load and a location of each solution providing virtual machine, one of the at least one solution providing virtual machines.

6. The method of claim 5, wherein:

the selected solution providing virtual machine performs a function based on a service information and returns a result of the performed function as a required solution to a corresponding solution managing device; and the service information includes data required for providing the first service.

7. The method of claim 4, wherein each solution managing device provides a predetermined solution to a plurality of service computing devices that provide services requiring the predetermined solution.

8. The method of claim 4, wherein each solution managing device creates a virtual machine that generates a predetermined solution.

* * * * *